United States Patent [19]

Lin

[11] Patent Number: 5,835,957
[45] Date of Patent: Nov. 10, 1998

[54] SYSTEM AND METHOD FOR A FAST DATA WRITE FROM A COMPUTER SYSTEM TO A STORAGE SYSTEM BY OVERLAPPING TRANSFER OPERATIONS

[75] Inventor: Pei-Hu Lin, Taipei Shyuan, Taiwan

[73] Assignee: Acer Incorporated, Taipei, Taiwan

[21] Appl. No.: 222,516

[22] Filed: Apr. 1, 1994

Related U.S. Application Data

[63] Continuation of Ser. No. 689,299, Apr. 22, 1991, abandoned.

[51] Int. Cl.$^6$ .............................. G06F 13/16; G06F 9/26
[52] U.S. Cl. ...................... 711/169; 711/167; 395/821; 395/287; 395/845; 395/852; 395/382; 395/878; 395/880; 395/868
[58] Field of Search .................................. 364/200, 900; 395/325, 425, 821, 287, 845, 489, 250, 200.7, 850, 878, 880, 852, 868, 382; 711/169, 167, 168

[56] References Cited

U.S. PATENT DOCUMENTS

| | | | |
|---|---|---|---|
| 3,638,195 | 1/1972 | Brender et al. | 395/200.42 |
| 4,417,304 | 11/1983 | Dinwiddie, Jr. | 395/845 |
| 4,442,484 | 4/1984 | Childs, Jr. et al. | 711/163 |
| 4,479,179 | 10/1984 | Dinwiddie, Jr. | 395/845 |
| 4,547,849 | 10/1985 | Louie et al. | 395/823 |
| 4,571,671 | 2/1986 | Burns et al. | 395/855 |
| 4,800,431 | 1/1989 | Deering | 348/719 |
| 4,916,605 | 4/1990 | Beardsley et al. | 711/162 |
| 5,003,463 | 3/1991 | Coyle et al. | 395/877 |
| 5,065,354 | 11/1991 | Jons et al. | 395/182.03 |

FOREIGN PATENT DOCUMENTS 0359384  3/1990  European Pat. Off. .

OTHER PUBLICATIONS

C.P. Grossman, "Evolution of the DASD Storage Control," IBM Systems Journal, vol. 28, No. 2, 1989, pp. 196–226, Armonk, New York, U.S.A.

B. Foster, "Caching EISA Bus Master Controller Performs at 33 Mbytes/sec .," Computer Technology Review, vol. 10, No. 5, Apr. 1990, pp. 77–82, Los Angeles, California, U.S.A.

"Memory Devices and Technology," Electronic Engineering, vol. 61, No. 754, Oct. 1989, pp. 76–89, Woolwich, London, Great Britain.

Lin, Y.T., and Cheng, M.C., "PC System I/O Controller Experiment", Jan. 1989, Chapter 7, pp. 7–22 and 7–23.

*Primary Examiner*—Tod R. Swann
*Assistant Examiner*—J. Peikari
*Attorney, Agent, or Firm*—Townsend and Townsend and Crew LLP

[57] ABSTRACT

A fast data write method for transferring data from a computer system to a storage system in a single tasking operating environment. A fast write flag is set in order to reflect the ready or busy state of the storage system. A processor of the computer system ends the storage data write cycle as soon as the data has been sent to the storage system. Thus, the processor does not waste any processor time after the data is sent, and transfers are made without compromising integrity of the data.

14 Claims, 7 Drawing Sheets

SYSTEM AND METHOD FOR A FAST DATA WRITE FROM A COMPUTER SYSTEM TO A STORAGE SYSTEM BY OVERLAPPING TRANSFER OPERATIONS

This is a continuation of application Ser. No. 07/689,299, filed Apr. 22, 1991, now abandoned.

BACKGROUND OF THE INVENTION

1. Field of the Invention

The present invention relates to a method for writing data to a storage system by a computer in a single tasking operating system.

2. Description of Related Art

In a computer system of the general type, the mechanical movement of a disk storage device is much slower than the speed of the processor unit. As a result, the processor often has to wait until the input/output procedure has been completed. Faster storage devices have been used to improve the total performance of the computer system; however, the delay time caused by the disparity between the processing speed of main memory in the computer system and the external storage device remains a problem.

When an application program is executed at a specified time in a single tasking operating environment, a common method for speeding up the reading of data from a disk is to store the data which is currently being most frequently accessed into the Disk Cache random access memory (RAM). This method divides the data on the disk into a predetermined number of pages. In some computer literature, this method has been named the Disk Cache process. At any time there is at least one frequently accessed page of the data in the Disk Cache RAM. If the data is in disk cache, it will be transferred to the application program directly from the Disk Cache RAM. If the data is not in the Disk Cache RAM, the whole page of disk data containing the requested data will be retrieved from disk and stored into the Disk Cache RAM. Simultaneously, the requested data will be transmitted to the application program. Because of the data access characteristics of most application programs, the possibility that data requested by the application program is in the Disk Cache RAM at the time requested is very high.

Figure 1:
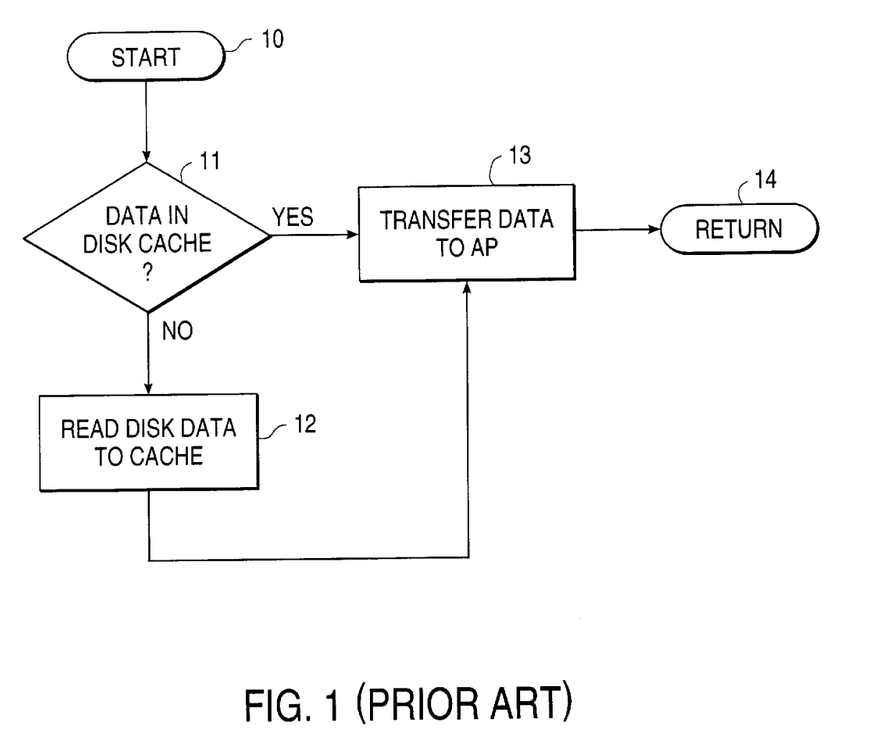
FIG. 1 is a flow chart of a prior art disk data read method.

The above described Disk Cache process is illustrated in FIG. 1. In FIG. 1, step 10 begins the Disk Cache process. In step 11 it is determined if the requested data is in the Disk Cache RAM. If the data is in the cache, in step 13 the requested data is transmitted to the application program from the Disk Cache RAM directly and then the program returns to the next instruction in step 14. If the data requested is not in the cache, then the process continues to step 12 where a whole page of the disk data containing the request data is stored in the Disk Cache RAM. After step 12, the process proceeds to step 13 to transmit the data to the application program.

Figure 2:
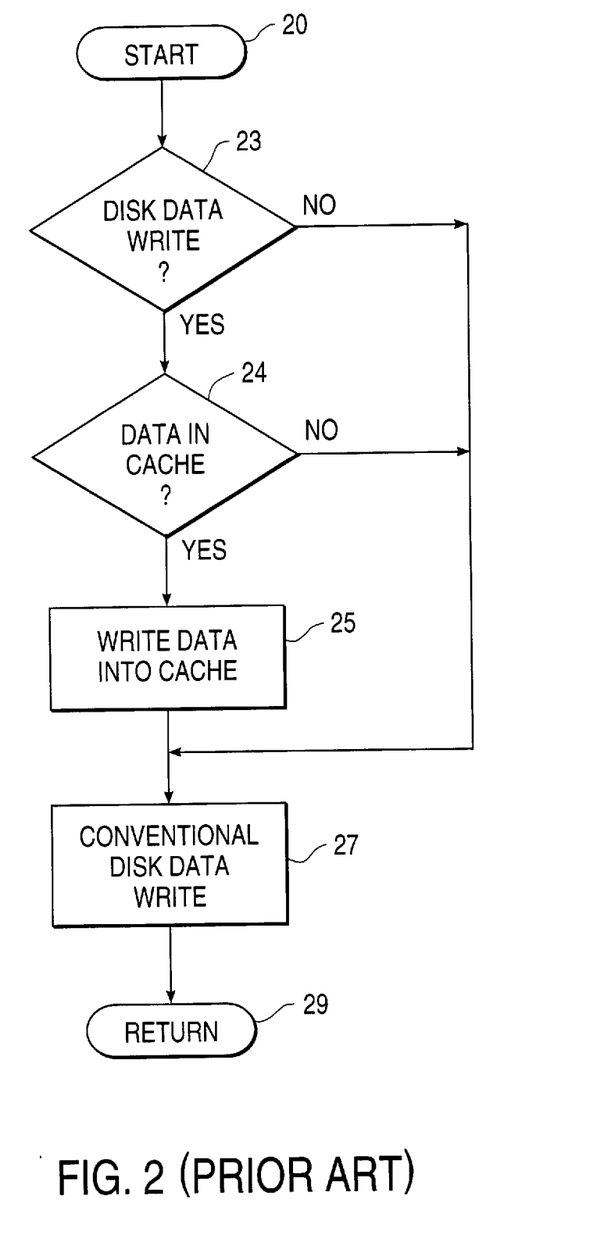
FIG. 2 is a flow chart of a prior art disk data write method.

FIG. 2 discloses a flow chart for executing a disk data write according to the prior art. The process begins in step 20. In step 23, the request is tested to determine if it is a disk data write request. If the request is not a disk write request, step 27 calls the input/output system program to complete the request. If the request is a write request, in step 24 it is determined whether disk data corresponding to the write request is in the Disk Cache RAM. If it is not in the Disk Cache RAM, a conventional disk data write is performed in step 27. A flow chart of a conventional disk data write is disclosed in FIG. 7 and will be explained later. If the data is in the cache, the data is written to the Disk Cache RAM in step 25. The process then goes to step 27 and returns to the application program in step 28.

Figure 3:
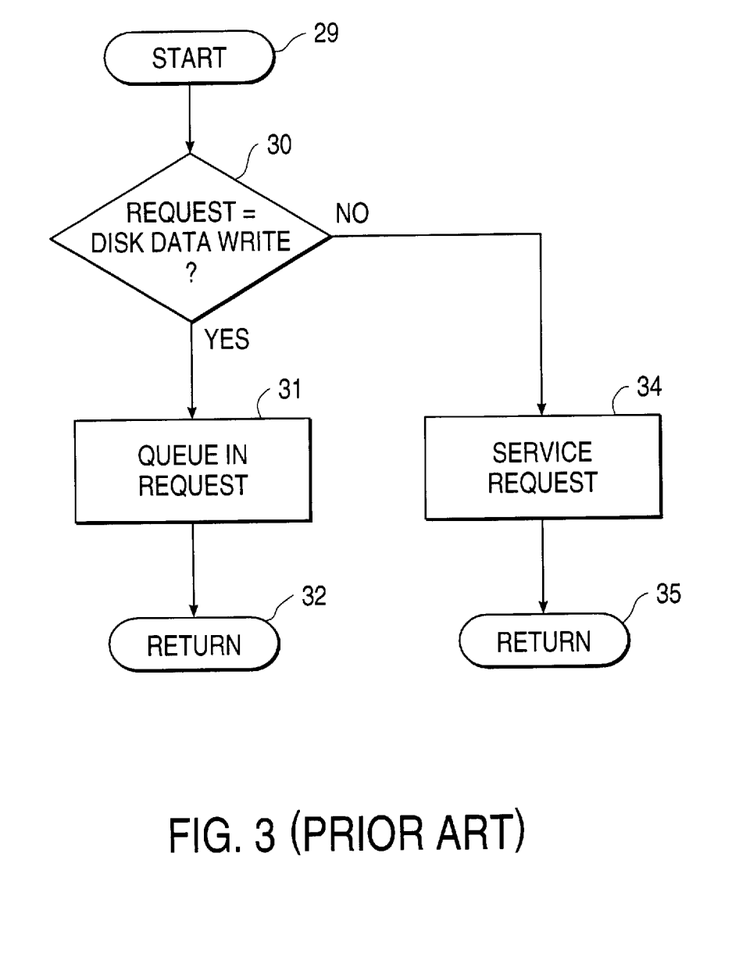
FIG. 3 is a flow chart of a prior art Lazy Write method.

FIG. 3 discloses another disk data write method of the prior art. This method is known as Lazy Write or Delay Write, and is frequently used in stable operating system environments. In step 30 the Lazy Write process determines if the request from the application program is a disk data write. If it is a write request, the process proceeds to step 31 and stores the data written in a temporary working memory area in the main memory. This disk data write request is queued at the lowest position of a predetermined queue array. Typically, the requests in the queue array are executed as a background task initiated by a controller handling the input/output operation. After step 31, the processor of the computer system complete this disk data write cycle and then executes other instructions. If the result of step 30 is not a disk data write, execution continues in step 34 to execution of the routine servicing of this request and then returns in step 35. A flag is set by the Lazy Write process which indicates whether the queue is full or not.

The Lazy Write process may not be used in an operating environment such as PC-DOS because the personal computer systems such as the IBM PC series are not a stable environment. The user of a PC series computer may reset the computer system at any time intentionally or accidentally. Therefore, the power system of the personal computer is not stable in some environments. If the Lazy Write is used in this kind of environment, the data of a disk data write request which is still queued in the temporary working memory area will be lost forever once the power is turned off even if for a very short period of time. Therefore, it is almost impossible to use the Lazy Write process in the PC-DOS environment.

Presently, environments such as PC-DOS often use a Direct Write through process for data security. Under this process, a disk data write is issued by the application program and the data written to the disk immediately. The processor of the computer system must wait and continue to check the status of this disk data write. No other instructions may be executed before the data is written into the disk. This process wastes a substantial amount of processor time thereby decreasing the performance of the computer system. This is especially true when the storage device is slow in comparison to the speed of the processor.

Thus, there is a need for a method to improve the speed at which data is written to a storage device without compromising the integrity of the transmitted data.

SUMMARY OF THE INVENTION

The present invention provides a system and method for a fast data write from a computer system to a storage system in a single tasking operating environment to substantially improve system performance without compromising the integrity of data. The system of the present invention comprises a computer system and a storage system. The storage system comprises a first processor, a storage means and at least one data buffer means. The computer system includes a second processor.

In the method of the present invention, a fast write flag is set by the second processor, and indicates a busy state of the storage system.

A preferred embodiment of the fast data write method comprises the steps of:

(1) checking the setting of the fast write flag to determine if the storage system is in a ready state or a busy state;

(2) repeating the checking step if the storage system is in a busy state;

(3) setting the fast write flag to indicate a busy state and enabling the data written to the storage system to be transmitted to the data buffer means of said storage system if the storage system is in a ready state; and (4) resuming instructions following the data write by the second processor before transmission of the data within the storage means is completed.

DETAILED DESCRIPTION OF THE PREFERRED EMBODIMENT

Figure 4:
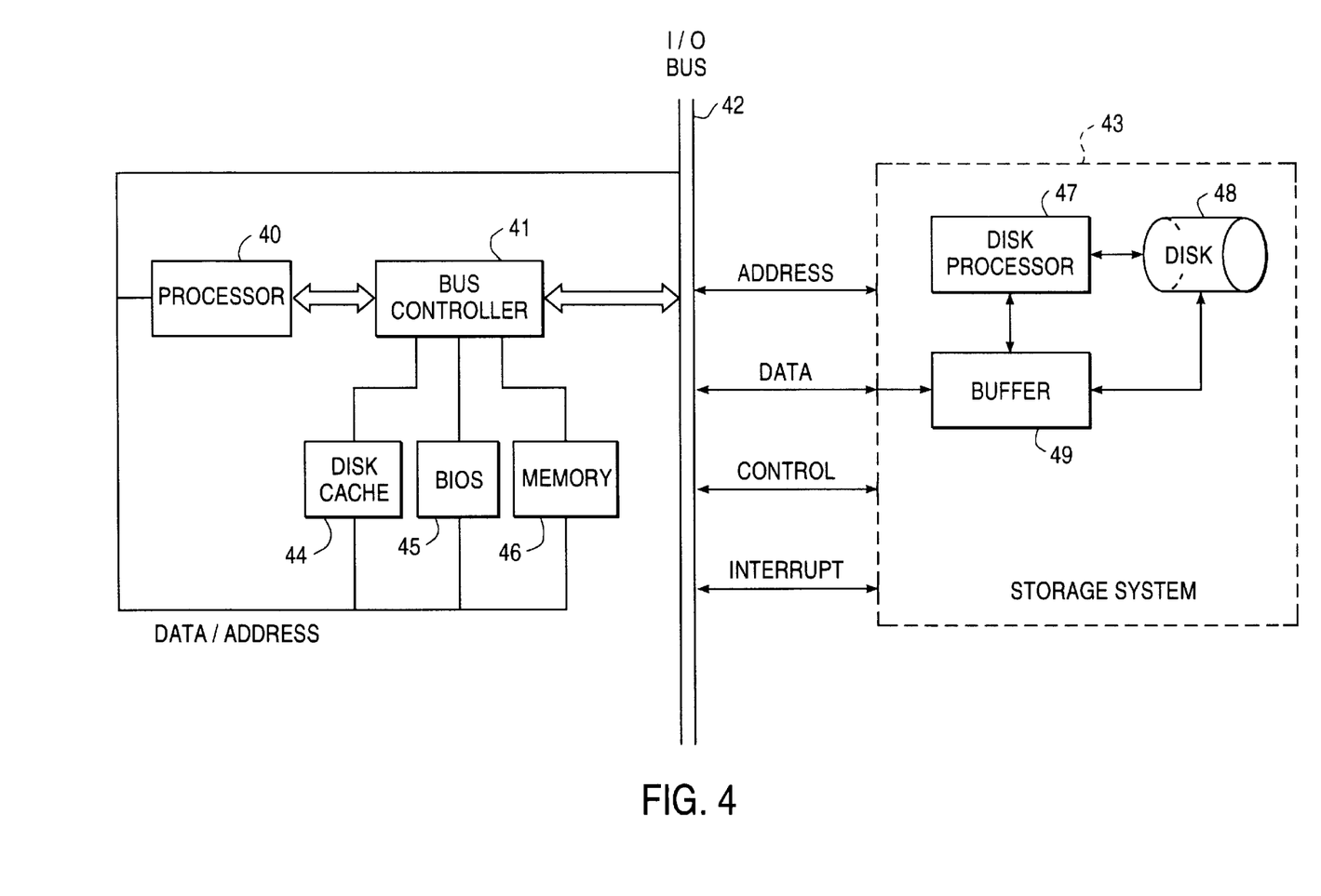
FIG. 4 is a preferred embodiment of the computer system of the invention for fast data write to a storage system.

Referring now to FIG. 4, a preferred embodiment of the system of the present invention is shown. The computer system comprises a processor unit 40 coupled to a bus controller 41. The bus controller 41 sends the data, address and command signals to a storage system 43 through an input/output bus 42. The storage system 43 comprises a storage processor 47, a data buffer means 49 and a storage device 48. The computer system may further comprise a cache storage device 44. This cache storage device 44 may also be installed within other storage means of the system at the user's discretion. For instance, the device 44 may be installed within the storage system 43. The basic input/output system 45 and Random Access Memory (RAM) 46 are also coupled to the bus controller 41. The RAM 46 stores the program implementing this invention, the flags used by this invention, such as the fast write (FW) flag, and other necessary routines. The RAM 46 also comprises free memory areas for program execution purposes. The input/output bus 42 comprises signal lines for transmission of data, address, interrupt and control signals.

In the following descriptions, a hard disk storage device is used as the storage device 48 for explanation purposes and ease of understanding. However, it should be understood to those skilled in the art that the present invention may be used with a variety of other storage devices known in the art.

Figure 5:
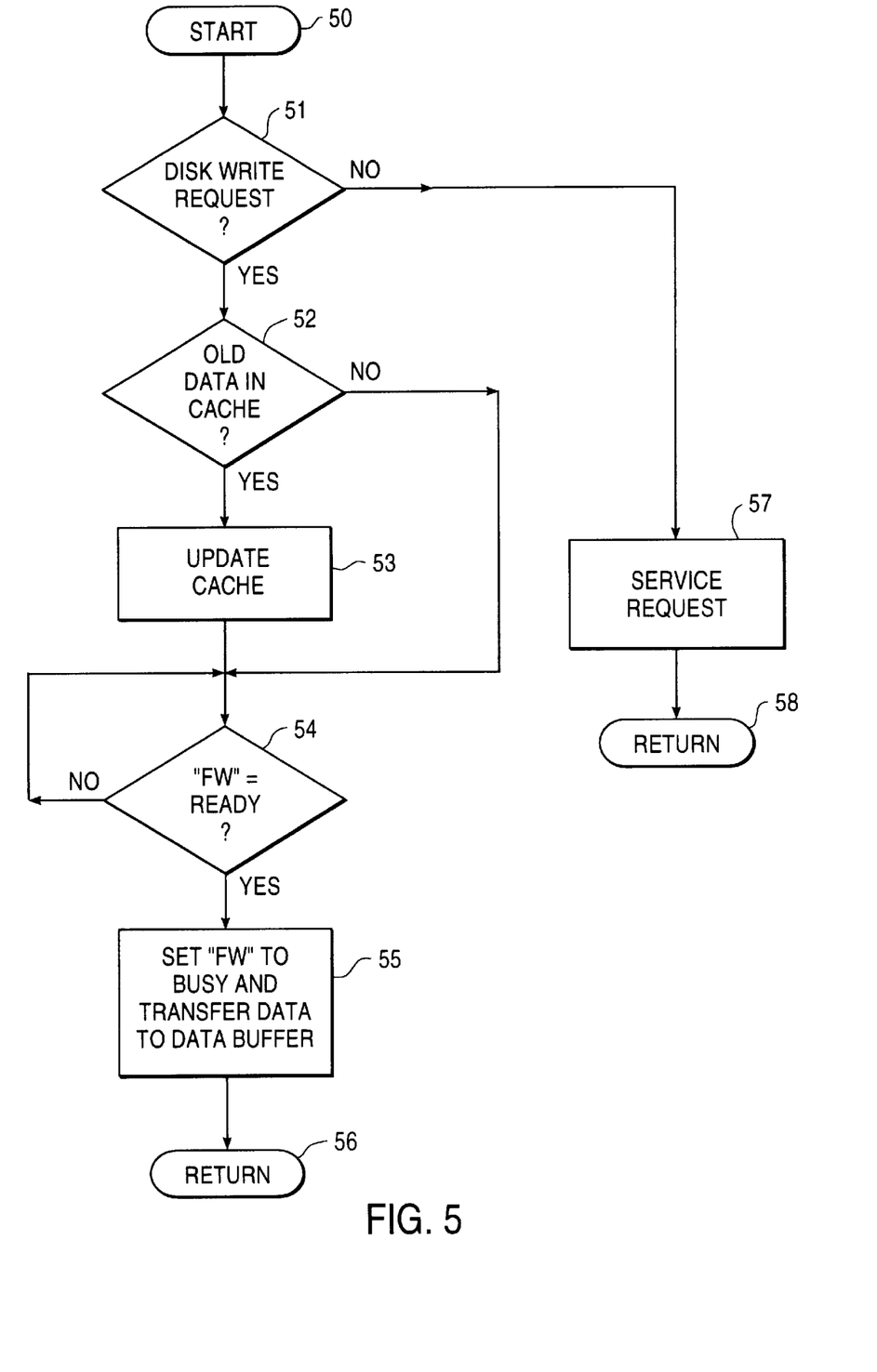
FIG. 5 is a flow chart of a preferred embodiment of the method of the present invention.

FIG. 5 shows a flow chart of a preferred embodiment of the present invention. In step 51 the system determines whether the request of the application program is a disk write request. If it is not, the method of the present invention jumps to the step 57 and executes the input/output program servicing this request. Then execution continues to step 58 and returns to the application. If it is a disk write request, in step 52 the system determines if the data corresponding to the request is in the cache storage means 44. If the data is stored in cache 44, then step 53 is executed. In step 53 the data is written into the cache storage means 44.

A Fast Write (FW) flag is set to indicate if the storage system 43 is in a ready state or in a busy state. If the storage system 43 is in a ready state, the data in the data buffer means 49 of the storage system 43 has been written to the storage device 48 and the data buffer means 49 is available for use.

In step 54, the system determines if the value of the FW flag represents the ready state. If it does not, then the method loops through step 54 until a ready state is detected. Afterwards, the method proceeds to step 55. Step 55 sets the FW flag to the value representing the busy state and transfers the data to be written to the hard disk device 48 to the data buffer means 49 of the storage system 43. Step 56 ends the disk data write cycle and performs the return step. Typically, the storage device 43 is still in the busy state at the end of step 56.

According to the preferred embodiment, as the data in the data buffer means 49 is actually being written into the hard disk by the processor 47, the processor 47 issues an interrupt signal to the processor 40. The interrupt signal causes the processor 40 to execute the service routing shown in FIG. 6.

Figure 6:
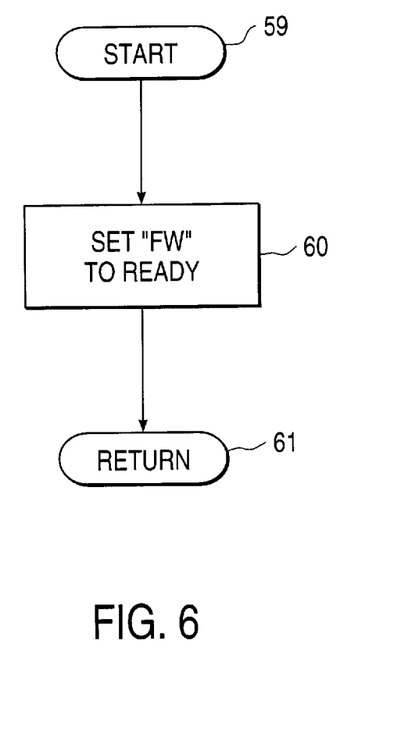
FIG. 6 is a flow chart of a servicing routine used by the preferred method of the present invention.

In the step 60 of FIG. 6, processor 40 sets the FW flag value to represent a ready state of the storage device 48. Only in the ready state, may the storage system 43 accept the next disk data read or data write request issued by the application program. The step 61 performs the return step.

Figure 7:
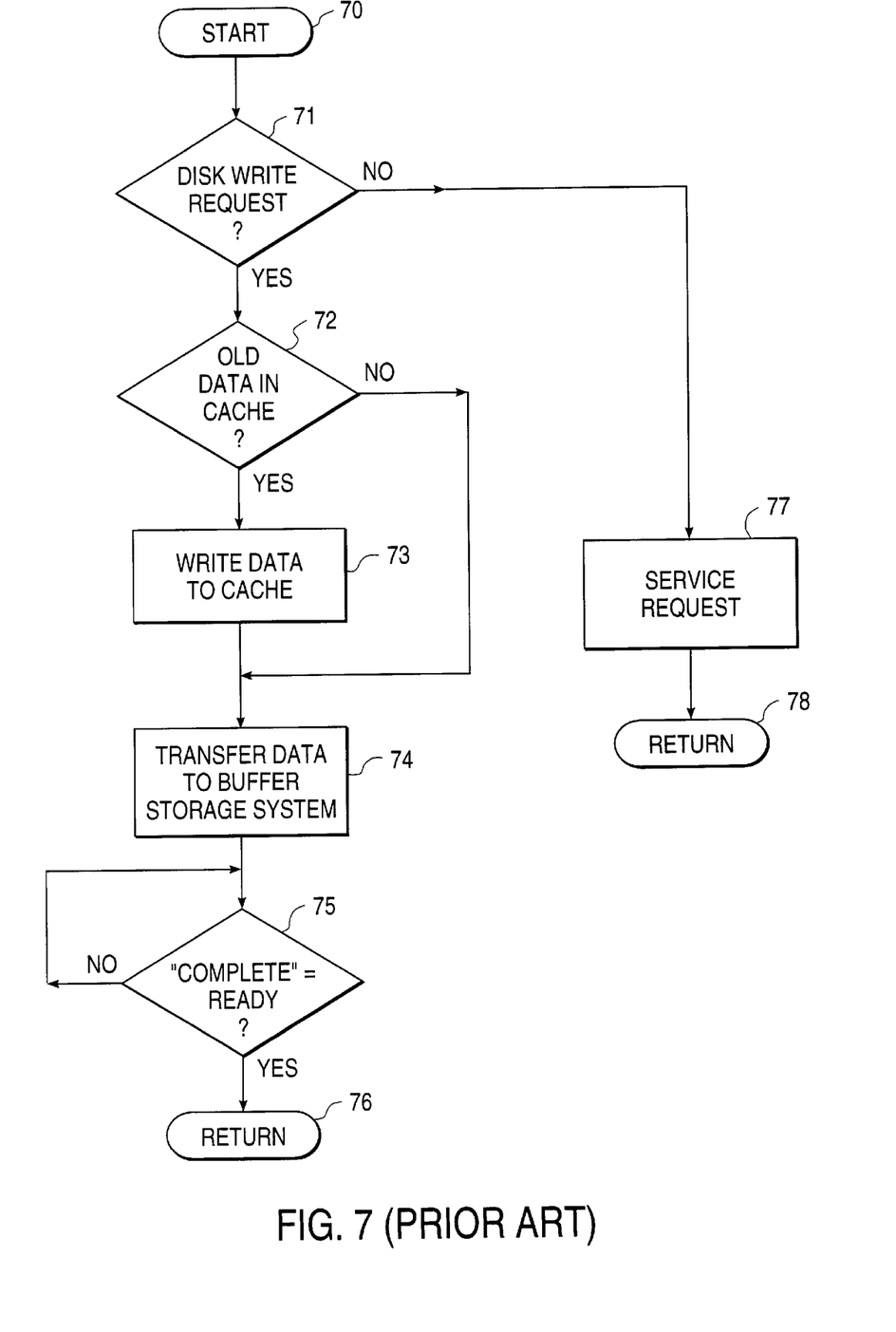
FIG. 7 is a flow chart of prior art Direct Write method.

In order to better understand the difference between the prior art Direct Write through process and the present invention, a flow chart of the Direct Write through process is shown in FIG. 7.

In step 71 of FIG. 7, the system decides if the request is a hard disk data write. If it is, in step 72 it is determined whether the data corresponding to the request is in the cache storage means 44. If it is not a disk write request in step 71, then the direct write process moves to step 77 to call the input/output routines servicing this request. Afterwards, the return step is performed in step 78. If the data is in the cache, then the system executes step 73. In step 73, data is written into the cache storage means 44 to update the storage means 44. In step 74, the system transfers the written data to the data buffer means 49 of the storage system 43 and sets the value of a complete flag to that of the busy state. The busy state means the storage system 43 is busy in a hard disk data write and before the completion of this data write any other data read or write request is prohibited. After step 74, the processor 40 executes step 75 which checks if the complete flag is set to a value of ready state. The ready sate means the data transmission to the storage device 48 is completed, the storage system 43 may accept other data read or write requests. If the value of complete flag is not in the ready state, then this process continues to execute the step 75 until the value of the complete flag is set in the ready state. After the ready state is detected, the process continues to step 76 to end this data write cycle and perform the return step.

The time interval between the beginning of the execution of step 75 and the beginning of the execution of step 76 is wasted processor time in the Direct Write through process. In the prior art method, as long as the storage system 43 is in the busy state the processor 40 must wait and is not able to perform any operations. In contrast, in accordance with the present invention, the processor 40 ends the disk data write cycle as soon as the data is sent to the storage system 43. Therefore, the processor 40 does not waste any time after the data is sent.

There is a flag indicating whether the queue is full or not in accordance with the Lazy Write process. The FW flag of the present invention is similar, however, the FW flag is an indication of the busy or ready state of the storage system 43.

In summary, the execution speed of application programs run on hardware implementing the Lazy Write process is much better than the conventional Direct Write through process. However, from the point of data integrity, the conventional direct write through algorithm and the present invention are comparable and far superior to the Lazy Write process.

The above description of the preferred embodiment of this invention has been simplified for illustration purposes, and the program implementing the method of this invention has been described as being stored in main memory for execution. Those skilled in this art will understand that the method of this invention maybe easily implemented as a hardware circuit. Therefore, the above description of the preferred embodiment is for illustration, and is not restricted in purpose. Any obvious modifications of this invention which are equivalent to this invention are within the true spirit as scope of the invention.

What is claimed is:

1. A method for a fast data write to a storage system by a computer system having a first processor in a single tasking operating environment, said storage system having a second processor, a storage device, and at least one data buffer, data to be written being received by said storage device through the data buffer, said method comprising the steps of:

checking, by the first processor, the value of a fast write flag to determine whether the storage system is in a hardware ready state or in a hardware busy state;

repeating the checking step, if the storage system is in the busy state;

if the storage system is in a ready state:

setting the value of the fast write flag to indicate the busy state;

transferring the data to the data buffer during a write cycle;

ending the write cycle by the first processor upon completion of the transferring step without requiring that the data be fully received by said storage device, while maintaining the fast write flag to indicate the busy state;

transferring the data from the data buffer to the storage device;

generating an interrupt signal by the second processor as the data to be written is transferred from the data buffer to the storage device; and setting the value of the fast write flag by the first processor to indicate the ready state in response to the interrupt signal.

2. The method of claim 1, wherein said computer system further comprises a cache storage device for storing data that is frequently accessed, the data access of said cache storage device being faster than that of said storage device; and the method further comprising the following steps before the checking step:

checking if data in the storage device corresponding to the fast data write is in said cache storage device; and writing the data to be written, into said cache storage device, to update said cache storage device if the step of checking the cache storage device determines that the corresponding data is in the cache storage device.

3. The method of claim 2, wherein the storage device is a hard disk storage device.

4. The method of claim 2, wherein the storage device is a floppy disk storage device.

5. The method of claim 2, wherein the storage device is a tape storage device.

6. The method of claim 2, wherein the storage device is a flash memory device.

7. In a computing system of the type wherein data to be written to a storage device in a storage system is first transferred during a write cycle by a first processor to a data buffer in the storage system and thereafter transferred by a second processor from the data buffer to the storage device, a method of operating the first processor comprising the steps of:

checking, by the first processor, a fast write flag to determine whether the storage system is in a hardware ready state or in a hardware busy state;

if the storage system is in the ready state:

setting the value of the fast write flag to indicate the busy state;

transferring the data to the data buffer during a write cycle by the first processor;

ending the write cycle by the first processor as soon as the transferring step completes while maintaining the storage system in the busy state, as indicated by the fast write flag;

transferring the data from the data buffer to the storage device by the second processor;

generating an interrupt by the second processor to the first processor when data is transferred by the second processor to the storage device; and setting the value of the fast write flag by the first processor to indicate the ready state in response to the interrupt.

8. The method according to claim 7 further comprising the step of enabling the transfer of data to the data buffer only when the fast write flag indicates the ready state.

9. A computer system comprising:

a memory system;

a first processor coupled to the memory system;

a storage system including a second processor, a storage device, and at least one data buffer, the storage system coupled to the first processor;

a fast write flag that indicates a ready state or a busy state for the storage system; and means responsive to an interrupt for setting the value of the fast write flag to indicate the ready state wherein the first processor writes data and the first processor comprises:

means for checking the fast write flag to determine whether the storage system is in the ready state;

means for setting the value of the fast write flag to indicate the busy state if the storage system is determined to be in the ready state;

means for transferring the data from the memory system to the data buffer; and means for ending the write cycle, after the data has been transferred, while the fast write flag indicates the busy state; and wherein the second processor comprises:

means for generating the interrupt while the data to be written is transferred from the data buffer to the storage device.

10. The system of claim 9, further comprising:

a cache storage system, coupled to the first processor, for storing data that is frequently accessed, wherein the data access of the cache storage system is faster than that of the storage device;

means for determining if data in the storage device corresponding to the data to be written is in said cache storage system; and means for transferring the data to be written into said cache storage system to update said cache storage system if the corresponding data is determined to be in the cache storage system.

11. The system of claim 10, wherein the storage device is a hard disk storage device.

12. The system of claim 10, wherein the storage device is a floppy disk storage device.

13. The system of claim 10, wherein the storage device is a tape storage device.

14. The system of claim 10, wherein the storage device is a flash memory device.

* * * * *